(12) United States Patent
Christensen et al.

(10) Patent No.: US 9,581,448 B2
(45) Date of Patent: Feb. 28, 2017

(54) OPTICAL SENSORS USING STIMULATED BRILLOUIN SCATTERING

(71) Applicant: MagiQ Technologies, Inc, Somerville, MA (US)

(72) Inventors: Caleb A Christensen, Somerville, MA (US); Anton Zavriyev, Swampscott, MA (US)

(73) Assignee: MagiQ Technologies, Inc., Somerville, MA (US)

( * ) Notice: Subject to any disclaimer, the term of this patent is extended or adjusted under 35 U.S.C. 154(b) by 82 days.

(21) Appl. No.: 14/262,089

(22) Filed: Apr. 25, 2014

(65) Prior Publication Data

US 2014/0320863 A1    Oct. 30, 2014

Related U.S. Application Data

(60) Provisional application No. 61/816,730, filed on Apr. 27, 2013, provisional application No. 61/976,098, filed on Apr. 7, 2014.

(51) Int. Cl.
  *G01C 19/66* (2006.01)
  *G01P 15/093* (2006.01)
  *G01C 19/72* (2006.01)

(52) U.S. Cl.
  CPC ........... *G01C 19/661* (2013.01); *G01C 19/66* (2013.01); *G01P 15/093* (2013.01); *G01C 19/72* (2013.01)

(58) Field of Classification Search
  CPC ...... G01C 19/66; G01C 19/661; G01C 19/72; G01C 19/721; G01C 19/722; G01B 9/02015; G01P 15/093
  See application file for complete search history.

(56) References Cited

U.S. PATENT DOCUMENTS

| 4,159,178 A * | 6/1979 | Vali | G01C 19/64 356/461 |
| 4,396,290 A * | 8/1983 | Morris | G01C 19/64 356/461 |
| 5,408,317 A * | 4/1995 | Dyes | G01C 19/66 356/461 |
| 2011/0249268 A1* | 10/2011 | Salit | G01C 19/66 356/459 |

OTHER PUBLICATIONS

M. S. Shahriar, Ultrahigh enhancement in absolute and relative rotation sensing using fast and slow light, May 8, 2007, Physical Review, Rev A 75, pp. 1-10.*
Miguel Gonzalez-Herraez, Optically controlled slow and fast light in optical fibers using stimulated Brillouin scattering, Aug. 18, 2005, Applied Physics Letters, 87, pp. 1-3.*

* cited by examiner

*Primary Examiner* — Michael P Lapage (57) ABSTRACT

A method for enhancing a sensitivity of an optical sensor having an optical cavity counter-propagates beams of pump light within the optical cavity to produce scattered light based on Stimulated Brillouin Scattering (SBS). The properties of the pump light are selected to generate fast-light conditions for the scattered light, such that the scattered light includes counter-propagating beams of fast light. The method prevents the pump light from resonating within the optical cavity, while allowing the scattered light to resonate within the optical cavity. At least portions of the scattered light are interfered outside of the optical cavity to produce a beat note for a measurement of the optical sensor. The disclosed method is particularly applicable to optical gyroscopes.

18 Claims, 7 Drawing Sheets

OPTICAL SENSORS USING STIMULATED BRILLOUIN SCATTERING

CROSS-REFERENCE TO RELATED APPLICATIONS

This application claims, under 35 U.S.C. §119(e), the priority from and the benefit of U.S. Provisional Application Ser. No. 61/816,730 filed on Apr. 27, 2013, and 61/976,098, filed on Apr. 7, 2014, both being incorporated herein by reference.

STATEMENT REGARDING GOVERNMENT FUNDED RESEARCH

The inventive contributions to the art disclosed herein were made with partial government support under one or more of the following contracts awarded by federal agencies indicated below. The government has certain rights in the invention.
AFRL: FA9453-13-M-0074 (AF SBIR, 2013)
NASA DSFRC: NNX13CD07P (NASA SBIR, 2013)
NASA KSC: NNX12CF05P (NASA SBIR, 2012)."

FIELD OF THE INVENTION

The present invention relates generally to optical sensors, and, more particularly, to a system and a method for increasing sensitivity of the optical sensors.

BACKGROUND OF THE INVENTION

Current state-of-the-art navigation systems incorporate optical sensors, such as gyroscopes and optical accelerometers. These optical sensors include no moving parts and can sense rotations and accelerations with high bandwidth and high accuracy. For example, conventional laser gyroscopes utilize the properties of the optical oscillator, e.g., a laser, and the theory of relativity to produce an integrating rate gyroscope.

The laser gyroscope operates on a well-known principle that rotation of an operating ring laser, also referred to as an "optical oscillator", about its axis causes the laser cavity to experience an apparent change in length for each direction. This apparent change in length creates a frequency shift in the laser oscillator in each direction. As between two counter-directionally travelling laser oscillations, portions of each may be superimposed so that the frequency shift is manifested as a beat frequency. This beat frequency is proportional to the rate of angular rotation of the gyroscope and is, therefore, measurable to provide an indication of the rate of angular rotation of the area circumscribed by the ring laser oscillator or ring laser gyroscope.

The laser gyroscopes offer high sensitivity, but there is a fundamental tradeoff between the size of an optical gyroscope and its sensitivity. The physical size of the gyroscopes which possess the requisite sensitivity for inertial navigation is acceptable for uses in commercial airliners or large nautical vessels. However, size, weight and power (SWaP) attributes are far more restricted in space launch vehicles, unmanned aerial vehicles, and other applications, so any reduction in size of the components of inertial measurement unit can yield major benefits or enable new applications.

Accordingly, there is a need to increase sensitivity of the optical sensors, such as optical gyroscopes and accelerometers, without increasing their SWaP attributes.

SUMMARY OF THE INVENTION

It is an object of some embodiments of an invention to provide a system and a method for increasing sensitivity of optical sensors, such as optical gyroscopes and accelerometers, while reducing an increase of size, weight and power (SWaP) attributes of the optical sensors.

The invention also relates to optical architecture and control scheme for a fast-light enhanced optical gyroscope which offers good stability of group velocity while minimizing requirements on the stability of specific parameters, particularly the pump laser intensity.

More particularly, various embodiments of the invention are based on a recognition that fast-light phenomena, where sharp features in the dispersion function of an optical medium cause the group velocity to become larger than the speed of light, can enhance the sensitivity of optical sensors. The fast-light enhancement requires strong nonlinear effects in a stable, controlled optical cavity, which can be achieved, e.g., using atomic vapor cells, free space optical elements, multiple frequency locked lasers, or high optical powers in solid state elements. However, such components are bulky, expensive, and sensitive to ambient conditions or vibrations.

Further, many embodiments of the invention stem from a realization that beams of pump light counter-propagating within the ring cavity can produce scattered light based on Stimulated Brillouin Scattering (SBS). When the properties of the pump light are selected in a special manner, the counter-propagating beams of pump light generate fast-light conditions for the scattered light, such that the scattered light includes counter-propagating beams experiencing fast-light conditions. Furthermore, to achieve stable fast-light effects, and stable power and spectrum of the pump light within the optical cavity, some embodiments of the invention prevent the pump light from resonating within the ring cavity, while allowing the scattered light to resonate within the ring cavity.

Accordingly, in one aspect, the invention relates to a method for enhancing a sensitivity of an optical sensor having an optical cavity. The method includes counter-propagating beams of pump light within the optical cavity to produce scattered light based on Stimulated Brillouin Scattering (SBS), wherein properties of the pump light are selected to generate fast-light conditions for the scattered light, such that the scattered light includes counter-propagating beams experiencing fast light conditions; preventing the pump light from resonating within the optical cavity, while allowing the scattered light to resonate within the optical cavity; and interfering at least portions of the scattered light outside of the optical cavity to produce a beat note for a measurement of the optical sensor.

In another aspect, the invention relates to an optical sensor, including a ring cavity; an input coupler for accepting counter-propagating beams of pump light within the ring cavity to produce scattered light based on Stimulated Brillouin Scattering (SBS), wherein the input coupler prevents the pump light, which has properties selected to generate fast-light conditions for the scattered light, from resonating within the ring cavity, while allowing the scattered light to resonate within the ring cavity; and an output coupler for directing at least portions of the scattered light outside of the ring cavity, while retaining the pump light within the ring cavity, and for interfering the portions of the scattered light outside of the ring cavity to produce a beat note for a measurement of the optical sensor.

Yet another aspect of the invention relates to an optical sensor, including an optical cavity; an in-coupling interferometer for accepting counter-propagating beams of pump light into the optical cavity to produce scattered light based on Stimulated Brillouin Scattering (SBS), wherein lengths of a short and a long path of the in-coupling interferometer are selected such that the pump light having properties for generating fast-light conditions for the scattered light emerges from a first output of the in-coupling interferometer directing the pump light away from the optical cavity to prevent the pump light from completing multiple passes through the optical cavity, and the scattered light emerges from a second output of the in-coupling interferometer that directs the scattered light to resonate within the optical cavity; an out-coupling interferometer integrated with the optical cavity, wherein lengths of a short and a long paths of the out-coupling interferometer are selected such that at least part of the scattered light propagated in each direction is directed by the out-coupling interferometer outside of the optical cavity and the pump light propagated in each direction is directed by the out-coupling interferometer to stay within the optical cavity; an interference module for interfering the scattered light received from the out-coupling interferometer to produce a beat note; and a detector for measuring a frequency of the beat note to determine a measurement of the optical sensor.

Definitions

As used herein for the purposes of this disclosure, the recited terms have the following meanings. All other terms and phrases used in this specification have their ordinary meanings as one of skill in the art would understand. Such ordinary meanings may be obtained by reference to technical dictionaries, such as, for example, McGraw-Hill Dictionary of Scientific and Technical Terms (6th edition).

Beam:

Light traveling in a single mode of an optical system. The beam can be a free space beam, but can also refer to light within waveguides or fibers.

Beat Note:

When two sinusoidal signals are received at a detector with nonlinear response (such as two light waves interfering on a power sensitive detector), a frequency equal to the difference in sinusoidal frequencies is called a beat note, which can be much lower in frequency (and possibly easier to measure) than either initial signal.

Brillouin Scattering:

A scattering mechanism within optical media which involves an interaction between acoustic waves and electromagnetic waves, resulting in energy being transferred from light at one frequency (often called the pump frequency) to light at another frequency (often called the Stokes frequency).

Coupler:

A device which allows light to enter or exit an optical cavity. The couplers in this patent can have properties which depend on the frequency, wavelength, or optical mode of the light.

Coupling Efficiency:

The fraction of light that passes from outside the cavity to inside, or vise-versa. High efficiency means nearly all of the light passes through, low efficiency means very little light passes through.

Cavity Mode:

A particular way for light to propagate in an optical cavity. As an example, a Ring Cavity has at least two cavity modes, one which travels in a clockwise sense, and another that travels in a counter-clockwise sense. In addition, cavities can have multiple longitudinal modes (which differ in frequency and/or wavelength), as well as multiple transverse modes (which differ in electric or magnetic field distribution while propogating).

Fast-Light:

A phenomenon where the group velocity of a medium exceeds $c \approx 3 \times 10^8$ m/s, the speed of light in a vacuum. This has additional effects, including pulse advancement and enhancement of gyro sensitivity, causing gyros to have a larger response to rotations.

Gain:

A property of an optical system causing light to increase in power as it propagates.

Group Index:

A dimensionless number equal to the ratio of the speed of light in a vacuum to the group velocity in a medium. A large group velocity corresponds to a near-zero group index.

Group Velocity:

A characteristic velocity describing wave propagation in a medium.

Gyro or Gyroscope:

A device which provides a measurable output that varies in a way that can be used to determine rotation rates.

Interference:

The phenomenon where the amplitudes of overlapping optical beams add constructively or destructively, causing the power measured at a specific point to be more or less than the sum of the powers of the overlapping beams. In addition, light of different frequencies will have interference effects that change rapidly over time, producing beat notes.

Loss:

A property of an optical system where light reduces in power as it travels.

Modulator (Optical Device):

Any optical device capable of introducing phase shifts, frequency shifts, intensity changes or other measurable changes to an optical signal in a controllable way. Common examples include Acousto-Optic Modulators, and Electro-Optic Modulators.

Optical Gyroscope:

A device which uses optical techniques to measure rotations

Optical Mode:

A particular way for light to propagate in an optical system, which has unique properties that differ from other ways for light to propogate in the system. The unique properties include the position and direction of travel, and the particular distribution of electro-magnetic fields.

Pump Source:

A laser device, generally a commercial product with significant output power and high reliability, which provides energy to or otherwise influences an optical device. The term is used in this document to distinguish such a laser from lasers produced in the cavity or used strictly for measurement purposes.

Pump Light:

Light produced by a Pump Source. This term is used to distinguish such light from light generated within nonlinear elements or light coupled out of the system.

Resonate:

To travel through a cavity multiple times. Important effects of resonating include frequency/wavelength dependent properties (such as coupling efficiency and power within the cavity), because of interference of the light from multiple trips around the cavity.

Ring Cavity:

A closed optical path where light is allowed to take multiple trips around the path in a single direction. Light can generally travel in either direction in a ring cavity Ring Laser Gyroscope:

A particular type of optical gyroscope, which uses a ring cavity containing a gain medium to generate lasers whose frequencies depend on the rate of rotation of the ring.

Scattered Light:

Light, which is generated within the gain medium. In the case of Brillouin Scattering, this is light produced in a nonlinear optical medium when pump light is present. In much of this patent, this refers to the light produced within a ring laser cavity, distinct from pump light coupled into the cavity.

Stability:

Used to generally refer to the case where properties of a physical phenomenon change relatively little over time or due to environmental disturbances. For example, stability of light means that both the optical spectrum and power remain relatively constant even in the presence of electrical noise, vibrations, or thermal drifts. Stability of a measurement means that the output of the measurement changes little over time.

Stimulated Brillouin Scattering (SBS):

A special case of Brillouin Scattering (see above) where a strong signal present at the Stokes frequency stimulates additional scattering of energy from the pump frequency. This results in nonlinear effects, such as amplification, nonlinear loss, and laser action.

Spectrum:

A mathematical description of the distribution of measurable properties vs. frequency. As an example, an optical power spectrum is a description of the power distributed among a range of optical frequencies, and a gain spectrum is a description of the gain experienced by different frequencies of light within a medium.

Splitter:

An optical device which causes light in one mode to be separated into two or more modes with a particular distribution of power. An example is a fiber splitter, which takes one or more fibers in, and has one or more fibers out. Light entering one fiber leaves in two or more fibers, and interference effects can influence behavior if light enters in two or more fibers at the same time.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Various implementations of the present invention and related inventive concepts are described below. It should be appreciated, however, that the present invention is not limited to any particular manner of implementation, and that the various embodiments discussed explicitly herein are primarily for purposes of illustration.

Some embodiments of the invention enable a fast-light enhanced optical gyroscope by providing an optical architecture for efficient and stable coupling of pump light into a nonlinear ring cavity while simultaneously allowing scattered light to resonate within the cavity. Some variations of the embodiments implement such an optical architecture using proven fiber optic and photonic integrated circuit technologies.

Furthermore, some embodiments of the invention may use ring cavities for devices other than gyroscopes (such as accelerometers which effect a ring cavity by moving elements of the cavity), or may use linear cavities as the sensitive elements (such as thermometers or displacement sensors which measure changes of optical path length).

Some embodiments of the invention stem from a recognition that fast-light effects can enhance sensitivity of an optical sensor, e.g., a ring laser gyroscope (RLG) or other optical gyroscope that can be implemented in a Sagnac interferometer. In addition, it was recognized that it is advantageous to generate fast-light using Stimulated Brillouin Scattering to enhance sensitivity of the optical sensors by orders of magnitude as compared to conventional devices of similar geometry.

Figure 1:
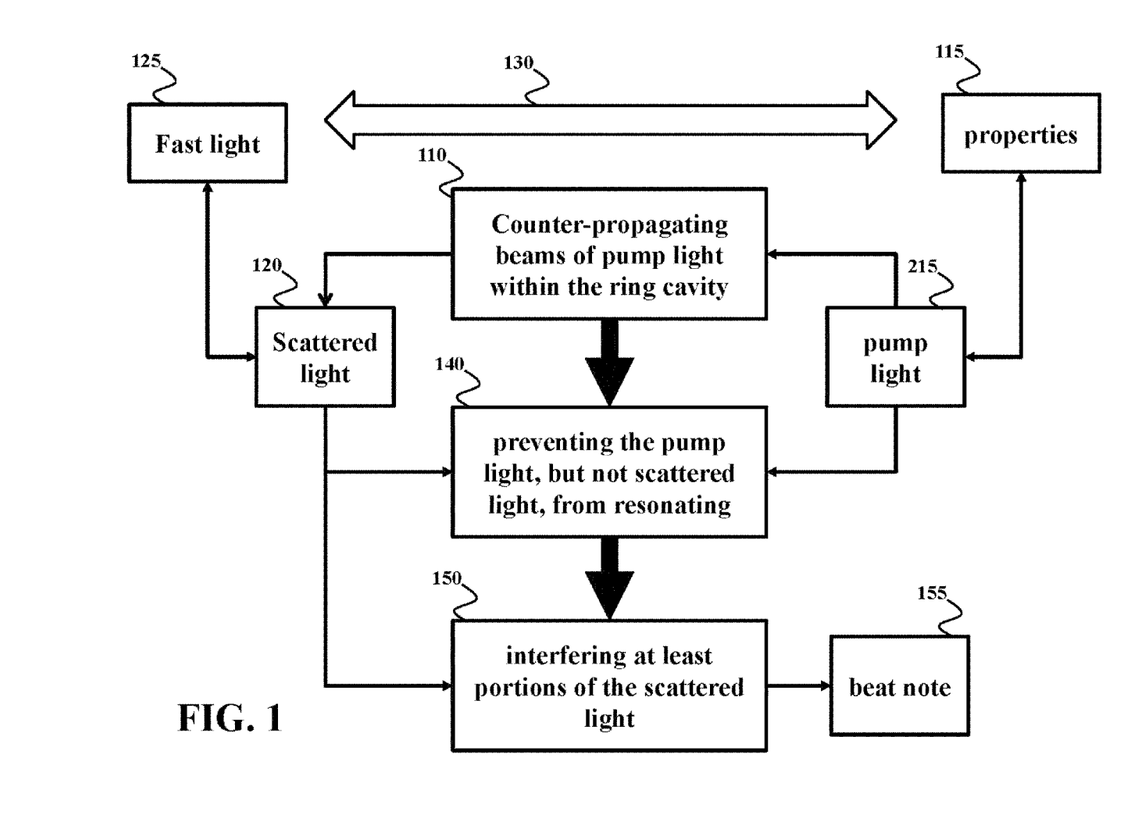
FIG. 1 is a block diagram of a method for enhancing a sensitivity of an optical sensor having an optical cavity according to some embodiments of the invention.

FIG. 1 shows a block diagram of a method for enhancing a sensitivity of an optical sensor having an optical cavity according to some embodiments of the invention. The method counter-propagates 110 beams of pump light 215 within the optical cavity to produce scattered light 120 based on Stimulated Brillouin Scattering (SBS). The pump light can be generated in a pump source and coupled into the optical cavity. The pump light can include two beams which are coupled into the optical cavity in opposite directions. For example, in one embodiment having the optical cavity implemented to include a ring cavity, the opposite directions are a clock-wise direction and a counter-clockwise direction.

The pump light, through the SBS, generates scattered light, with each pump beam generating a scattered beam traveling in the opposite direction. Thus the scattered light includes two beams propagating in the opposite directions. The properties 115 of the pump light are selected 130 to generate fast-light conditions for the scattered light, such that the scattered light includes counter-propagating beams of fast light 125. The method prevents 140 the pump light from resonating within the optical cavity, while allowing the scattered light to resonate within the ring cavity. In such a manner, the method achieves stable fast-light effects in the optical cavity.

Next, the method interferes 150 at least portions of the scattered light 120 outside of the optical cavity to produce a beat note 155 for a measurement of the optical sensor. For example, the scattered light resonates within the optical cavity, and is coupled out of the cavity. This results in two beams exiting the cavity, with each beam including a portion of the scattered light propagating in one direction. The two portions of the scattered light are combined to interfere. The interfering portions of the scattered light are analyzed, for example, using a photodector.

The analysis can include measuring the frequency of the beat note, which represents the difference in frequency of the counter-propagating beams of fast light. This frequency changes in dependence on the speed of rotation of the optical cavity. Once analyzed, the optical sensor acts as a gyroscope.

If the optical cavity includes a ring cavity, such gyroscope forms a ring laser gyroscope (RLG) with fast-light enhanced sensitivity. Specifically, when the pump light 215 within the ring cavity has certain properties 115, e.g., specific values of a particular optical spectrum and a particular power, the pump light causes fast-light effects in the ring cavity. These effects change the relationship of wavelength to frequency, which causes the frequency of the beat note to change much more with rotations than in a similar RLG without fast-light effects. This enhancement of rotation sensitivity is a desirable property in a RLG.

However, to use the RLG effectively, the frequency measurement should be stable so that a specific rotation provides a specific beat frequency that does not change with time or environmental disturbances. This requires that the fast-light effects, and therefore the pump light power and spectrum within the cavity, are stable. In addition, the scattered light should resonate in the cavity in a stable way. This requires that the coupling of the pump light into the cavity be stable and efficient, while the scattered light remains within the cavity efficiently.

Figure 2:
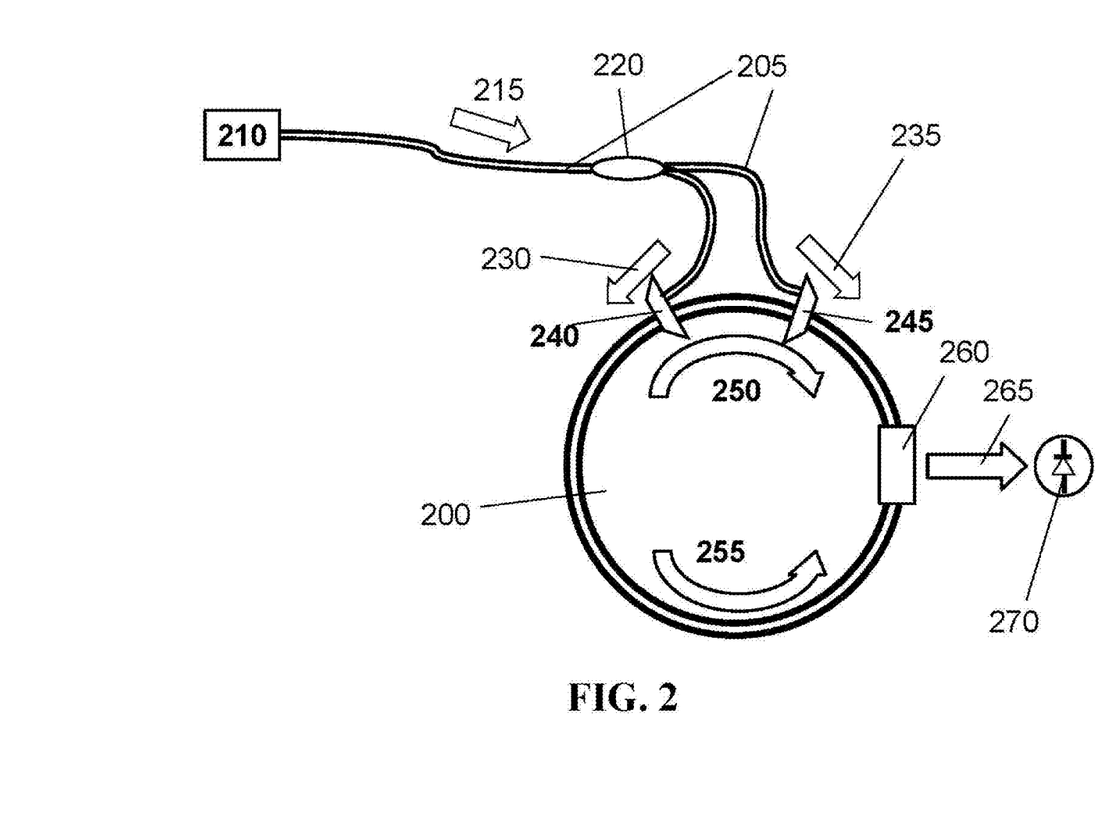
FIG. 2 is a schematic of an optical sensor implement as a RLG with fast-light enhanced sensitivity according to one embodiment of the invention.

FIG. 2 shows a schematic of an optical sensor implemented as a RLG with fast-light enhanced sensitivity according to one embodiment of the invention. The RLG includes a light source 210 producing the pump light 215. The light source can include one or more laser sources, modulators, splitters, or other optical devices. The pump light 215 can includes one or more beams of pump light that are sent along optical paths 205 into a splitter 220, which splits the power of pump light 215 into a first beam of pump light 230 and a second beam of pump light 235. The optical path 205 can include one or combination of an optical fiber, a waveguide and a system of free space optics.

These beams of pump light are coupled into the ring cavity 200 with input couplers 240 and 245. For example, the first beam of pump beam 230 enters the cavity through a coupler 240, propagates counter-clockwise within the ring cavity, and generates scattered light 250 propagating in the clockwise direction because of the properties of SBS.

Similarly, the second beam of pump light 235 enters the ring cavity 200 through a coupler 245, propagates clockwise within the ring cavity 200, and generates scattered light 255 propagating in the counter-clockwise direction. Other embodiments can have other relationships between the pump and the scattered light.

At least a portion of scattered light 250 and 255 exit the cavity through the output coupler 260. Generally, the output coupler 260 allows the portions of the scattered light 250 and 255 to exit in different directions. The portions of the scattered light are combined outside of the optical cavity, e.g., with a splitter to produce to produce an interfered light 265 having a beat note 155. A frequency of the beat note of the light 265 is measured, for example on a photodiode 270, to determine rotation of the ring cavity or other properties of interest.

The rotation of the ring cavity 200 can be determined because the ring cavity 200 supports lasing in both the clockwise and counterclockwise directions. A typical RLG incorporates a large area free-space ring cavity or many large loops of fiber formed into a resonator. If the laser is rotating, one mode of scattered light 250 experiences a slightly shorter or longer effective cavity length than the other mode 255.

This is because the output coupler 260 moves in the time for the light to complete a circuit of the ring, such that $$L = L_0 \pm \delta L_{\mathit{eff}} = L_0 \pm \frac{L_0}{cn}\Omega R, \qquad (1)$$

wherein n is an index of refraction, which is a function of frequency, R and L0 are the radius and total fiber length of the cavity 200, and $\Omega$ is the rotation rate of the RLG. In embodiments with a non-circular cavity, R is a replaced with a measure of effective distance from the center of rotation of the non-circular cavity. The rotation introduces a difference in output frequency of the modes 250 and 255, and that difference can be measured as a beat note when the output laser 265 is measured on a photodiode 270. Furthermore, the RLG is self-zeroing, such that when there is no rotation, the frequency of the beat note is zero.

In some embodiments, the pump source 210 generates counter-propagating pump beams 230 and 235 where the spectrum of the pump beams can be selected to generate fast-light conditions for counter-propagating scattered light 250 and 255 produced by Stimulated Brillouin Scattering (SBS) of the pump light 230 and 235. The counter-propagating pump beams 230 and 235 and the counter-propagating scattered light 250 and 255 propagate around the ring simultaneously, e.g., the beams 230 and 255 propagates in one direction, while the beams 235 and 250 propagates in the opposite direction.

In various embodiments, the light source generates the pump light having properties selected to generate fast-light conditions for the scattered light using the SBS. The SBS allows for the production of narrow, tunable gain and absorption features at any laser wavelength. The SBS is the result of the pump light 230 and 235 scattering from periodic density fluctuations caused by acoustic waves in, e.g., a fiber of the optical cavity. Resonant scattering requires that the wavelengths meet the Bragg condition, $\lambda_a = \lambda_1/2$ (the acoustic wavelength is half the optical wavelength) or $f_a = f_1 \cdot 2$ sn/c, where $f_1$ is the frequency of the laser light, and $f_a$ is the frequency of the acoustic waves, and s and c/n are the velocity of sound and light, respectively, in the medium.

The beams of the pump light 230 and 235 are scattered to produce the scattered light 250 and 255. The scattered light 250 and 255 is produced at a frequency shifted relative to the pumping beams by the amount $f_a$, which is on the order of 10 GHz in most glasses. Each beam of the pump light creates a narrow linewidth beam of the scattered light propagating in the opposite direction in the same fiber. The pump light and the scattered light interfere, producing a superposition wave with periodic intensity fluctuations. These intensity fluctuations excite additional acoustic waves which enhance the density fluctuations, leading to more scattering.

This positive feedback effect ensures that if the pump light has a predetermined power, the scattering process is stimulated until the majority of the pump laser is coherently scattered into the scattered light beam 250 or 255.

Within the ring cavity 200, these effects can happen at relatively low pump power, as the scattered light waves 250 and 255 resonate within the cavity, so that the same light contributes to the stimulated scattering process multiple times. In this case, the beams of pump light 230 and 235 can provide gain for the beams of scattered light 250 and 255 on each trip through the ring cavity 200. If the gain experienced by the scattered light per round trip exceeds the loss per round trip, the beams 250 and 255 of the scattered light undergo lasing, which provides high power, narrow linewidth light in the output laser 265.

A typical fiber pumped by a narrow linewidth pump source produces a single narrow SBS gain feature of width 10-100 MHz centered at frequencies about 10 GHz below the pump frequency, as well as a single narrow SBS loss feature at frequencies about 10 GHz above the pump frequency representing the scattered light being sent back into the pump.

One embodiment relies on inexpensive, reliable telecom-grade fiber components, and substitutes the use of free-space elements or atomic vapor cells with the SBS effect. This embodiment is cost-effective, small in size and weight, and robust against environmental disturbances such as shock, vibration, and temperature changes. However, alternative embodiments take advantage of spectral properties of other media, such as vapor cells or nonlinear crystals, and includes those media within the ring cavity 200.

In some embodiments, the cavity 200 is pumped to operate as a non-fast-light enhanced RLG using much less pumping power with reduced rotation sensitivity but simplified stability requirements. In other embodiments, overall gain is added to the cavity 200 using optical amplifiers, such as semiconductor optical amplifiers.

Using Fast Light to Enhance Sensitivity

The optical sensors of various embodiment of the invention take advantage of the ability to modify the group velocity of narrow band light, thereby allowing the propagation velocity of light pulses to be slowed to much less than the speed of light in a vacuum $$c = 3.0 \times 10^8 \text{ m/s},$$

or enhanced to be faster than the speed of light. This group velocity can be expressed in terms of the index of refraction n as $$v_g = \frac{c}{n + \omega \frac{\partial n}{\partial \omega}} \equiv \frac{c}{n_g}, \qquad (2)$$

where $n_g$ is defined as the group index.

In most materials where index of refraction is greater than 1 and relatively constant, $v_g$ is smaller than c, but in systems with high dispersion or narrow resonances, $v_g$ can be much larger. For example, the Kramers-Kronig relation dictates that any system with a narrow absorption resonance experience a large increase in group velocity when the frequency is near resonance. A narrow dip in a gain spectrum or two nearly resonant gain spectra can similarly produce fast light, but without the overall loss associated with absorption resonance.

The frequency shift in an RLG can be measured as the beat note which arises from the interference between the counter-propagating scattered light 250 and 255 in the ring. The frequencies ($\omega\pm$) of beams 250 and 255 can be determined by fitting an integer number of wavelengths into the effective length of the cavity:

$$L_0 \pm \delta L_{\text{eff}} = \frac{2\pi mc}{n(\omega^\mp) \cdot \omega^\mp}, \qquad (3)$$

wherein m is a large integer and the orientation of the signs indicates that the mode experiencing longer cavity length exhibits lower frequencies.

For the case where frequency shifts are small compared to the linewidth of dispersive features $$n(\omega^\mp) \cdot \omega^\mp \approx (n_0 \mp n'\delta\omega) \cdot (\omega_0 \mp \delta\omega) = n_0\omega_0 \mp \delta\omega(n_0 + n'\omega_0) + n'(\delta\omega)^2, \qquad (4)$$

wherein n' is shorthand for the derivative $\partial n/\partial \omega$. The last term in Equation (4) is usually small, and the second term is $\delta\omega \cdot n_g$.

Accordingly, after linearizing for small $\delta\omega$, Equation (3) can be written as $$L_0 \pm \delta L_{\text{eff}} = \frac{2\pi mc}{n_0\omega_0 \mp \delta\omega \cdot n_g} \approx \frac{2\pi mc}{n_0\omega_0}\left(1 \pm \delta\omega \frac{n_g}{n_0\omega_0}\right) \qquad (5)$$

The prefactor on the right hand side is exactly $L_0$, so the first terms on each side cancel, and using Equation (1) to substitute for $\delta L_{\text{eff}}$ gives $$\delta L_{\text{eff}} = \frac{L_0}{cn_0}\Omega R = L_0\delta\omega \frac{n_g}{n_0\omega_0} \rightarrow \delta\omega = \frac{\omega_0}{cn_g}(\Omega R) \qquad (6)$$

Equation (6) shows that the frequency shift for a given rotation rate is scaled by the factor $1/n_g$, which enhances sensitivity in the case of fast light. In principle, the group index can be zero (suggesting infinite enhancement), but in practice the enhancement is limited by the fact that fast light can only be produced over a narrow bandwidth, and once the Sagnac shift $\delta w$ exceeds this bandwidth, the enhancement is lost. Some embodiments select the enhancement for a specific range of rotations, rolling off outside that range and giving a somewhat logarithmic response to rotations.

Some embodiments of the invention are configured to shift the fast-light spectrum by shifting pump source 210 frequency and/or using additional optical modulators with adjustable frequencies to maintain enhancement if needed. In some embodiments, the beams of pump light 230 and 235 are adjusted independently to keep the frequencies within the fast-light bandwidth, giving high small-signal sensitivity but linearizing the response to large rotations.

As an example, an implementation of one embodiment includes a gyro with a ring cavity 200 formed by five meters of fiber, wrapped into 50 loops 3 cm in diameter, and provides ~1 MHz frequency shifts for rotation rates of 1 rotation per second before fast light enhancement. With a fast light enhancement factor of $10^6$ and ability to measure 1 kHz frequency shifts, the embodiment is sensitive to $10^{-9}$ rotations per second.

By measuring the light with an optical power detector and using frequency selective filters, amplifiers, and established RF techniques, the optical signal in the output laser 265 can be measured as an RF signal with frequencies in the range from DC to a few hundred MHz, depending on the rotation rate and fast-light enhancement. Such a frequency signal can be measured quickly with high precision and accuracy using established techniques.

Fast-Light Via SBS

Figure 3A:
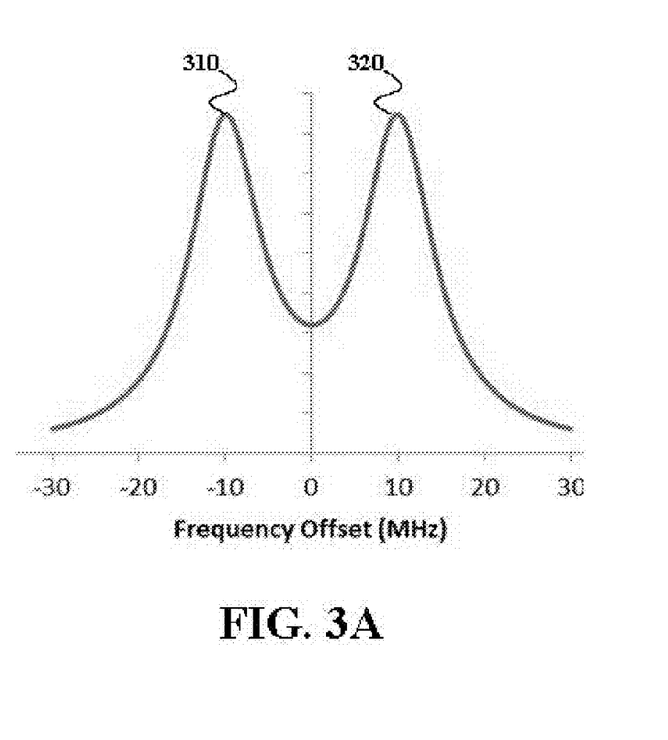
FIG. 3A and FIG. 3B are examples of optical spectra for creating fast-light conditions according to various embodiments of the invention.
Figure 3B:
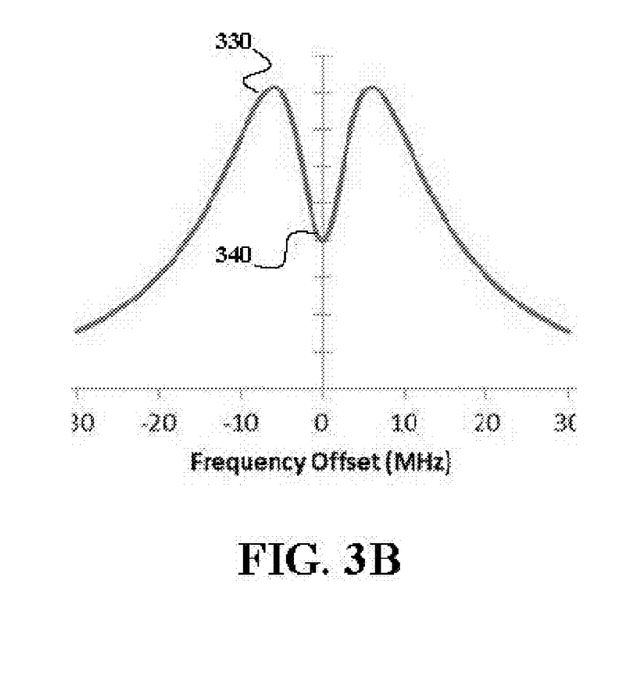

Narrow gain and loss features within an optical medium can produce fast-light effects, as described above. Because SBS produces both narrow gain and narrow loss at different frequencies, different embodiments use different ways of achieving fast-light lasing. For example, one embodiment uses two closely spaced narrow-band gain spectra 310 and 320 of the pump light, as shown in FIG. 3A. Another embodiment uses a combination of a relatively broadened gain spectrum 340 and a narrow-band loss spectrum 350 of the pump light, as shown in FIG. 3B. These gain spectra can be produced in several ways.

Some embodiments uses pumping light with a spectrum combining two narrow frequency components separated by ~10 MHz. Another embodiment uses one broadened component (offset by ~10 GHz above the frequency of the scattered light, and one narrow component (offset by ~10 GHz below the lasing frequency) In either embodiment, the difference in frequencies between the pump light and scattered light is substantially constant, e.g., ~10 GHz. 10 MHz and 10 GHz are typical values, but will vary depending on the optical fiber, the wavelength used, and other factors in the system design.

In some embodiments, the frequencies of order 10 MHz represent fast-light bandwidths or gain bandwidths, while the frequencies of order 10 GHz represent the frequency offset of the scattered light from the pumping light. In other media, these frequencies, and the cavity requirements that depend on them, may be different.

Figure 4A:
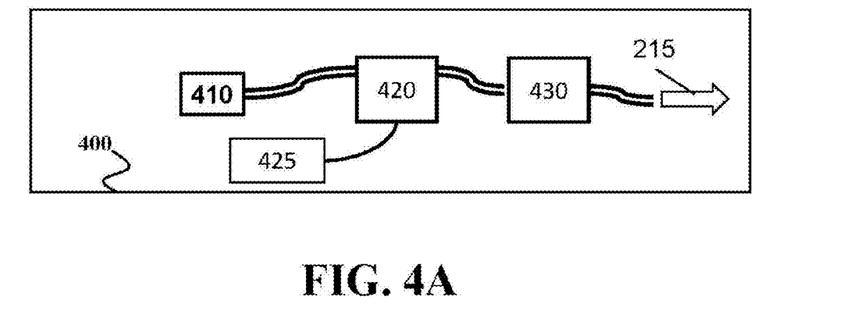
FIG. 4A and FIG. 4B are schematics of light sources for generating pump light according to some embodiments of the invention.

FIG. 4A shows a schematic of a light source 400 for generating the pump light 215 having properties selected to generate fast-light conditions for the scattered light according to one embodiment of the invention. In the light source 400, the desired spectrum of the pump light 215 is achieved with frequency separation by modulating a single laser source 410 with a modulator 420, and passed through an optional optical filter 430.

The modulator 420 is driven by a stable, controllable frequency source 425 and applies sidebands to the optical spectrum from the source 410, producing multiple narrow linewidth components in the optical spectrum of the pump light 215. One variation of this embodiment uses the modulator to produce two or more sidebands leading to three or more evenly spaced components, and uses an optical filter 430 to remove all of the components except two. Another variation uses a modulator configured as a Mach Zender Interferometer with electro-optical components in each arm. Such a modulator can be biased to suppress the fundamental mode, leaving two sidebands having the majority of the energy from the source 410. Residual light from unwanted components can still be removed with an optical filter 430.

Figure 4B:
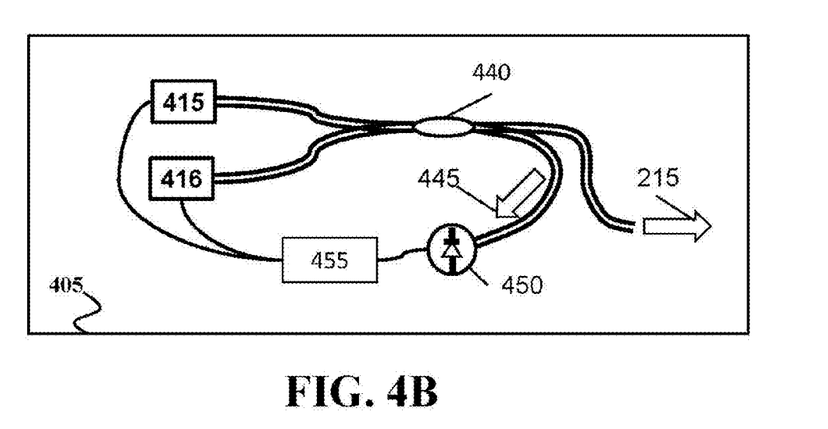

FIG. 4B shows a schematic of a light source 405 for generating the pump light 215 according to another embodiment of the invention. In the light source 405, the desired spectrum is achieved with two or more laser sources, i.e., a first laser source 415 for generating a first pump light and a second laser source 416 for generating a second pump light. The first and the second beams of pump light are combined in an optical combiner 440 to produce the beams of pump light 215 and a beat note 445 of the beams of pump light. A frequency of the beat note 445 is measured on one or more detectors 450.

The measurements of the beat note between the first and the second beams of pump light are processed by control electronics 455 and used to feedback to both lasers 415 and 416. In particular, the beat note can be measured and one or both lasers 415 and 416 can be adjusted to maintain a fixed value of the beat note 445. In addition, more samples of the output of one or both laser 415 and 416 can be measured for optical power, wavelength, or other parameters, and used to further control the lasers with the control electronics 455. These additional measurements are not shown. The result is that the pump light 215 includes two beams with control over their relative frequencies, absolute frequencies or optical power.

In other embodiments, the proper spectrum in the pump light 215 can be produced from a single laser passing through an acousto-optic modulator and recombined. In any of these embodiments, the stability and power consumption depend on available lasers and modulators, as well as the cavity dynamics.

Fast-light can also be generated using other physical phenomena, including nonlinear interactions in crystals or other solid state media, multi-photon transitions or near resonant interactions in atomic vapors, or engineered dispersion relations in metamaterials. In some embodiments, the nonlinear fiber or ring cavities can be replaced with these other physical systems, in which case the fiber is replaced with an appropriate medium. In some embodiments the pump lasers may not be required and can be replaced with electro-magnetic radiation of a frequency necessary to generate interesting nonlinear effects (such as lasers or RF sources to drive multiphoton processes in solid state systems or atomic vapors), in which case the phrase "scattered light" is understood to represent the frequencies of light subject to sharp dispersion features or nonlinear effects.

Requirements for Coupling Pump Light

In various embodiments, the pump light 215 is couple into the optical cavity in a stable way, while the scattered light beams 250 and 255 resonate within the cavity. Because both pump light and scattered light pass through the input coupler, such as couplers 240 and 245, the input coupler meets some particular requirements.

In particular, if the pump light 215 is allowed to resonate in the ring cavity 200, the coupling efficiency vary with frequency, and the particular relationship of coupling efficiency versus frequency changes as the ring cavity 200 rotates or experiences other environmental disturbances. As the pump light 215 has a particular frequency spectrum described above, this variance can complicate the operation of the gyroscope, so having the pump light resonate in the cavity 200 is undesirable.

However, the scattered light 250 and 255 should resonate efficiently in order to produce a narrow linewidth output laser 265 with enough power for accurate measurement. In particular, if the coupling scheme causes too much scattered light 250 and 255 to leave the ring cavity 200 each pass, the scattered light would have a broad spectrum and may not experience the desired fast-light effects.

Therefore, in a number of optical sensing applications of various embodiments of the invention, the pump light 215 and the scattered light are separated and/or individually manipulated. Additionally or alternatively, some embodiments direct at least part of the scattered light outside of the ring cavity 200, into an output laser 265, while forcing the pump beams 230/235 to stay within the ring cavity 200 to prevent pump light from affected the measurement of the properties of the scattered light.

Those properties of the input and output couplers can be achieved using fiber based components, the existing telecom devices, such as wavelength division multiplexers (WDMs)

or differential phase shift keying (DPSK) devices, either lack the appropriate spectral properties or experience unacceptable loss. This is because, due to the characteristics of the SBS, the difference in frequencies between the pump light 215 and scattered light 250/255 is too small for conventional frequency filters, multiplexers, or de-multiplexers to properly manipulate. Accordingly, there is a need for different methods for individual manipulation of the pump light 215 and scattered light 250/255.

Coupling Using Unbalanced Interferometers

Some embodiments of the invention are based on a recognition that regardless of the spectrum of the pump light 215 selected to generate the fast-light conditions for the scattered light, the difference in frequencies between the pump light and the scattered light is substantially constant. For example, in both embodiments of light sources 400 and 405, the difference in frequencies between the pump beam and the scattered light is substantially constant, e.g., about 10 GHz.

Accordingly, some embodiments are based on a realization that an unbalanced interferometer can be used to separate and/or individually manipulate the pump beams 230/235 and scattered light 250/255. This is because the lengths of short and long paths of the unbalanced interferometer can be selected based on that difference in frequencies and the requirements of the specific task. For example, if the pump light and scattered light differ in frequency by exactly 10 GHz, an interferometer where one arm is 1 cm longer than the other separates the beams efficiently.

Figure 5:
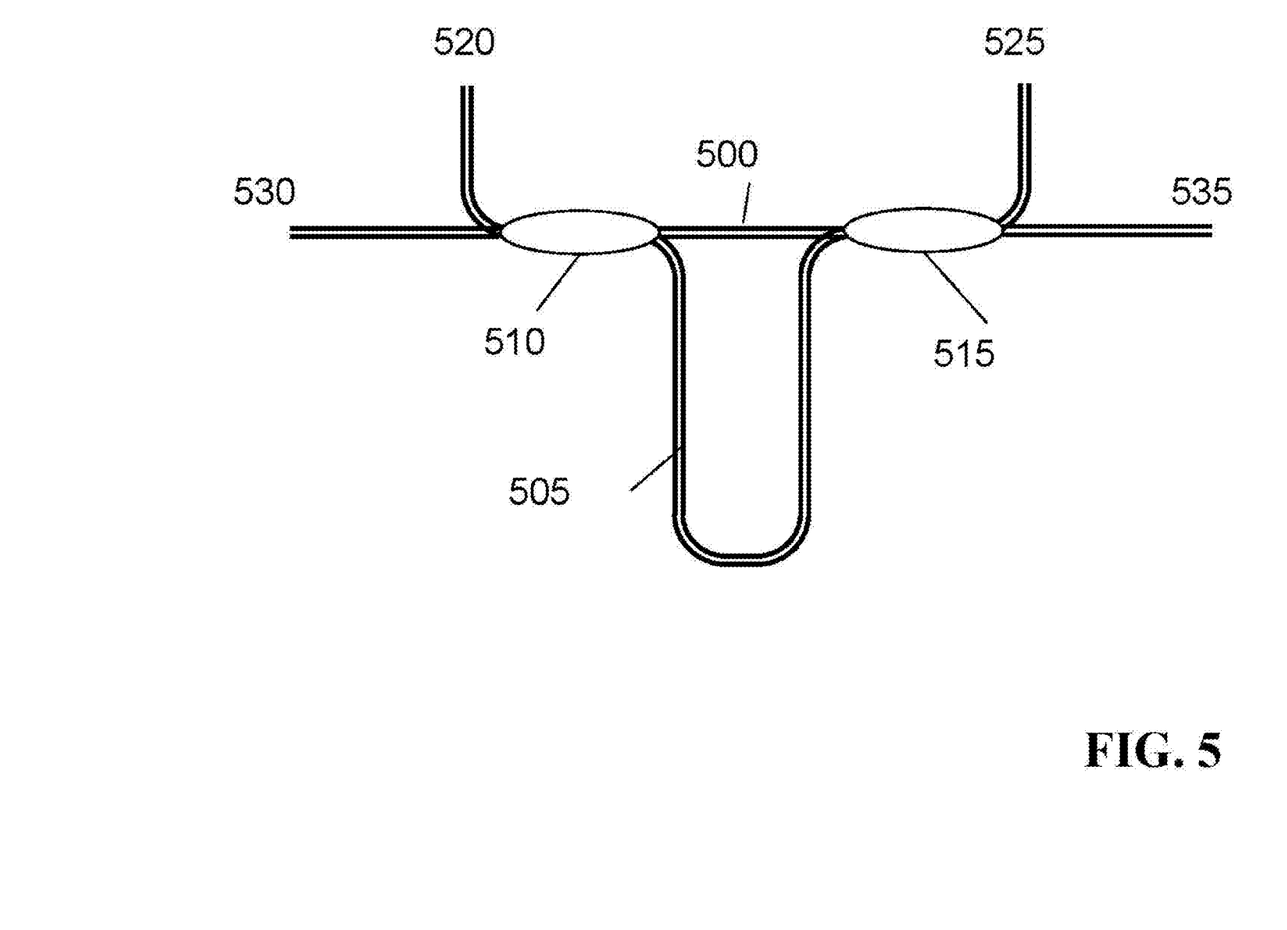
FIG. 5 is a schematic of an interferometer for in-coupling or out-coupling the light inside and outside of the optical cavity of the optical sensor according to some embodiments of the invention.

FIG. 5 shows a schematic of an interferometer for in-coupling or out-coupling the light inside and outside of the optical cavity of the optical sensor according to some embodiments of the invention. The length of the short path and the length of the long path of the interferometer are selected based on a difference between a frequency of the pump light and a frequency of the scattered light.

For example, the lengths of waveguides 500 and 505 and the coupling properties of splitters 510 and 515 can be selected so that light at different frequencies is directed in varying amounts to the different ports 520, 530, 525 and 535. For example, the lengths of paths are selected such that the first light with frequency F1 that enters a port 520 exits entirely from port 525, and the first light that enters a port 530 exits entirely from a port 535. The second light has another frequency F2, which can be very close to the frequency F1. If the lengths of 500 and 505 are selected correctly, when the second light enters a port 520, the second light exits entirely from a port 535. When the second light enters a port 530, the second light exits entirely from a port 525.

According to those principles, some embodiments determine lengths of a short path and a long path of the interferometer such that beams of the pump light and the scattered light entered into an input of the interferometer emerge from different outputs of the interferometer.

For example, in some embodiments, the input coupler, such as the couplers 240 and/or 245, includes an in-coupling interferometer integrated with the ring cavity, wherein lengths of a short and a long path of the in-coupling interferometer selected such that the pump light emerges from a first output of the in-coupling interferometer and the scattered light emerges from a second output of the in-coupling interferometer, wherein the first output is directed away from the ring cavity to prevent the pump light from completing multiple passes through the ring cavity and the second output directs the scattered light to stay within the ring cavity.

Similarly, in some embodiments, the output coupler, such as the coupler 260, includes an out-coupling interferometer integrated with the ring cavity, wherein lengths of short and long paths of the out-coupling interferometer are selected such that at least part of the scattered light propagated in each direction is directed outside of the ring cavity. The output coupler can also include an interference module for interfering the scattered light received from the out-coupling interferometer to produce the beat note.

As multimode behavior in the cavity 200 can decrease signal to noise ratio and degrade device performance, the ring cavity 200, input couplers 240 and 245, and output coupler 260 can be tuned to support only one longitudinal mode in each direction at frequencies within the gain spectrum. This can be advantageous for additional control over the mode of the scattered light 250 and 255, possibly relaxing requirements on other aspects of the ring cavity 200, such as FSR and finesse.

Options for Improved Measurement and Control of the Sensor

If the counter-propagating pump beams 230 and 235 have spectra which are shifted in frequency relative to each other using modulators driven by an RF signal of known frequency or locked at a known frequency difference, the counter-propagating scattered light beams 250 and 255 likewise will be separated by a similar frequency, in addition to the frequency shifts generated by rotations or other perturbations of the cavity 200.

This modification is optional, but allows additional benefits. For example, the frequencies to be measured, instead of being near DC for small rotations, can be maintained around a fixed offset (perhaps 10 to 100 MHz), to avoid noise and challenges of base-band measurements. Also, the spectra of beams 230 and 235 can be independently adjusted to track rotations so that at any finite rotation, the laser modes are at the center of the gain spectra. This can improve the linearity of the measurements or center the range of expected rotations (for example in spin-stabilized rockets which already rotate at a significant rate), or allow a servo-based measurement scheme. Furthermore, a RLG, where the modes of the scattered light 250 and 255 are identical in frequency under zero rotation, can have a problem with scattering causing the modes to "seed" each other, which causes the system to lock at zero frequency difference for a range of small rotation rates. This problem can be mitigated if the gain spectra of the two modes are well separated from each other.

In order to achieve stable performance of the optical sensor, several additional measurements of system properties are made and used by some embodiments to compensate for changes during post-processing of the measurements or to force some system properties to maintain fixed values.

In some embodiments, these measurements can include thermometer readings of the ring cavity 200, of any unbalanced interferometer or other coupling device, or other elements of the system. In some embodiments, these measurements can include optical power measurements or frequency measurements of one or more pump beams (215, 230 or 235). In some embodiments, the measurements can include measurements of optical power of scattered light beams 250 or 255, either within the cavity 200 or in the output lasers 265.

In some embodiments, the optical sensor includes a manipulator for applying a force to the ring cavity which varies with time in a predetermined way. For example, the ring cavity can be intentionally manipulated with mechanical elements, for example piezoelectric stacks which shake or stretch the ring cavity 200 a known amount at a known frequency, to intentionally produce rotations or other changes of the ring cavity 200. When these manipulations are correlated with other measurements of the system, specific properties of the system can be more readily distinguished. For example, one embodiment can determine whether the power of scattered light 250/255 has dropped because of a loss of pump light PL, 230 or 235, a change in coupling efficiency at a coupler 240, 245, or 265, or drift of the cavity 200 mode frequencies relative to the pump light 215 frequency. Thus, measurements correlated to the predetermined force can be analyzed and used to adjust pumping sources, modulators, or temperatures, or to compensate for certain disturbances during subsequent processing of the signals.

The advantages of these additional features include improving stability of the system, improving signal-to-noise ratios of the measurement, or allowing operation of the device with cheaper or simpler components because required specifications can be relaxed. This can be advantageous for the embodiments that rely on inter-connected nonlinear devices.

Exemplary Embodiment

Figure 6:
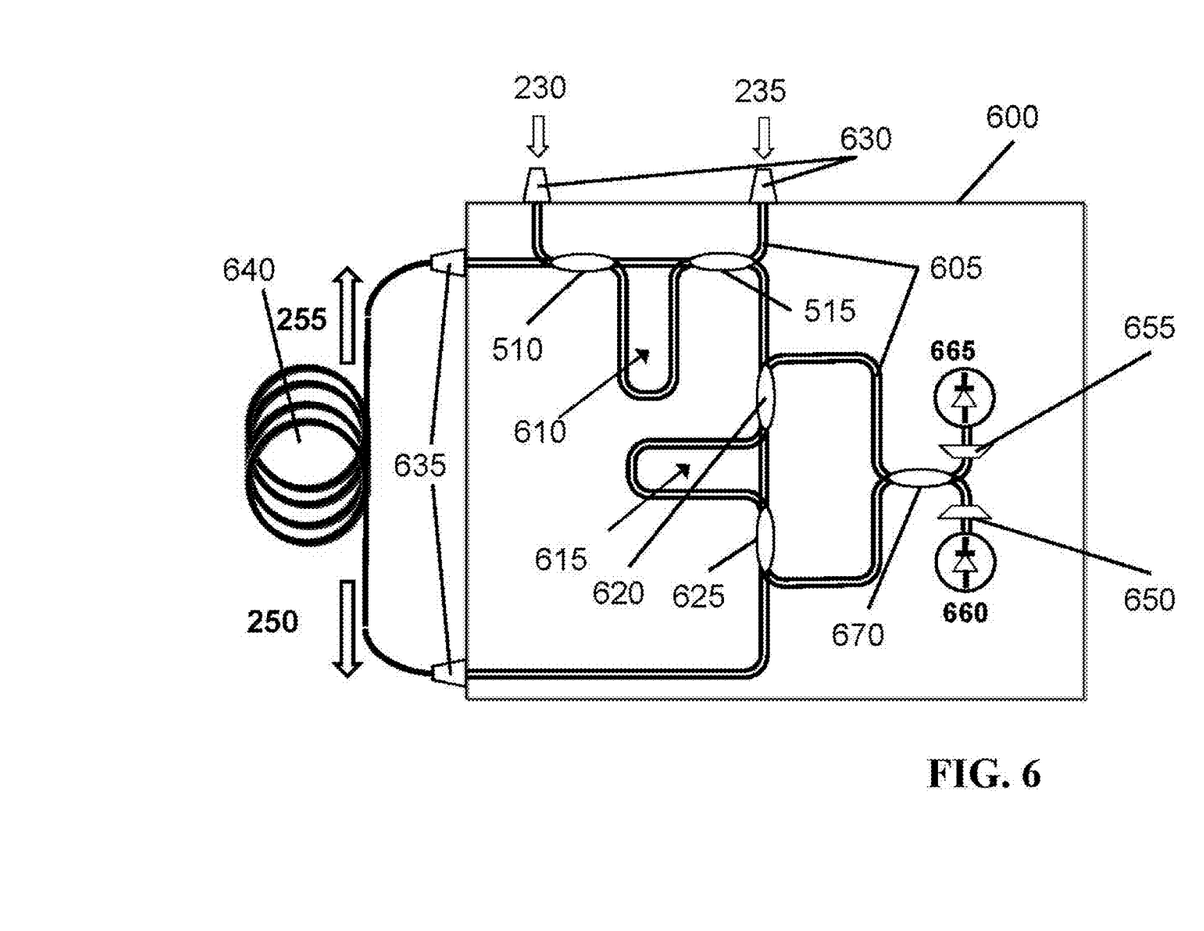
FIG. 6 depicts a schematic of an optical sensor according to one embodiment of the invention.

FIG. 6 shows a schematic of an optical sensor according to one embodiment of the invention. This embodiment includes a pair of custom unbalanced interferometers 610 and 615 integrated into the ring cavity 200. These interferometers are designed to have the exact spectral response, low insertion loss, and power handling ability required for our application.

Specifically, the optical sensor of this embodiment includes an optical cavity 640. For example, the optical cavity can include a ring cavity formed by a fiber optic. The optical sensor also includes an in-coupling interferometer 610, an out-coupling interferometer 620, an interference module 670 (in this embodiment, a splitter), and the detector 660 and/or 665. Advantageously, one or more of the in-coupling interferometer, the out-coupling interferometer, the splitter, and the detector can be fabricated on a photonic integrated circuit (PIC) 600 and use fiber optic elements for all components external to the PIC 600.

The in-coupling interferometer 610 is designed for accepting counter-propagating beams of pump light into the optical cavity to produce scattered light based on SBS. The lengths of a short and a long path of the in-coupling interferometer are selected such that the pump light having properties for generating fast-light conditions for the scattered light emerges from a first output of the in-coupling interferometer directing the pump light away from the optical cavity to prevent the pump light from completing multiple passes through the optical cavity, and the scattered light emerges from a second output of the in-coupling interferometer that directs the scattered light to resonate within the optical cavity.

For example, the pump light 230 and 235 enters the PIC 600 through fiber couplers 630, which couple between delivery fibers 205 and microfabricated waveguides 605. The ring cavity includes a segment of nonlinear optical fiber 640 and some of the waveguides 605 within the PIC 600. The interferometer 610 is tuned so that pumping frequencies are allowed into and out of the ring cavity while scattered light modes 250/255 remain within the cavity. Optical splitters 510 and 515 are 2×2 splitters, e.g., tuned to operate as 50/50 beamsplitters, to allow efficient transmission and good directivity of the light.

In some embodiments, lengths of a short and a long paths of the interferometer 610 can be selected such that after completing a trip around the optical cavity, the pump beams 230 and 235 emerge from a first output of the in-coupling interferometer and the scattered light 250 and 255 emerges from a second output of the in-coupling interferometer 610, wherein the first output is directed away from the optical cavity to prevent the pump beams 230/235 from completing multiple passes through the optical cavity and the second output directs the scattered light 250/255 to stay within the optical cavity.

Similarly, an out-coupling interferometer 615 is integrated with the optical cavity. The lengths of short and long paths of the out-coupling interferometer are selected such that at least part of the scattered light propagated in each direction is directed by the out-coupling interferometer outside of the optical cavity and the pump light propagated in each direction is directed by the out-coupling interferometer to stay within the optical cavity.

The interferometer 615 can also be used for the output coupler 260, which allows the output of modes of the scattered light 250 and 255 with minimal output of pump beams 230 and 235, thus avoiding potential issues with background interference and photodiode saturation. Additionally, optical splitters 620 and 625 can be selected to optimize laser performance by coupling out an appropriate amount of scattered light 250/255.

For example, in some embodiments, the interferometer 615 is an out-coupling interferometer, wherein lengths of a short and a long path of the out-coupling interferometer are selected such that at least part of the scattered light 250/255 is directed outside of the ring cavity 200. For example, in one embodiment, lengths of a short and a long path of the interferometer 615 are selected such that at least part of the scattered light propagated in each direction 250 and 255 is directed outside of the ring cavity 200, while the pump light 230/235 is forced to stay within the ring cavity 200.

A segment of nonlinear optical fiber 640 can be connected to the PIC 600 with fiber couplers 635. Laser modes 250 and 255 are generated within the fiber ring and pass through unbalanced interferometers 610 and 615 with minimal loss (apart from that intentionally coupled out by 615).

The modes of the scattered light can be combined at splitter 670 after being output by 615. The combined light is delivered to one or more photodiodes 660 and 665, after passing through filters 655 and 650 to remove remaining background light and clean up the signal. The electrical signals generated by photodiodes 660 and 665 include the beat note between modes 250 and 255 of the scattered light, which includes the information about rotation of the device.

One advantage of the output coupling interferometer 615 is that it already performs several functions, including preventing pump light from being present in the output light, so that filters 655 and 650 do not need to remove as much background light. This ultimately reduces the amount of additional light at photodiodes 660 and 665, improving the signal-to-noise ratio in the measurement of the beat note.

In some embodiments, the ring cavity 200 is arranged in various configurations. For example, a part of the ring cavity 200 used in a gyroscope can be arranged into a "figure eight" shape in order to form an accelerometer. In some embodiments, the lobes (the two circular portions of the figure eight) move with respect to each other, while being connected at a connection point, such that they experience effective rotations which combine to provide an total effective rotation of the ring cavity. The figure eight can be mechanically mounted and designed to have acceleration sensitivity without rotation sensitivity. A frequency of the beat note can then be measured to determine acceleration at the connection point.

Figure 7:
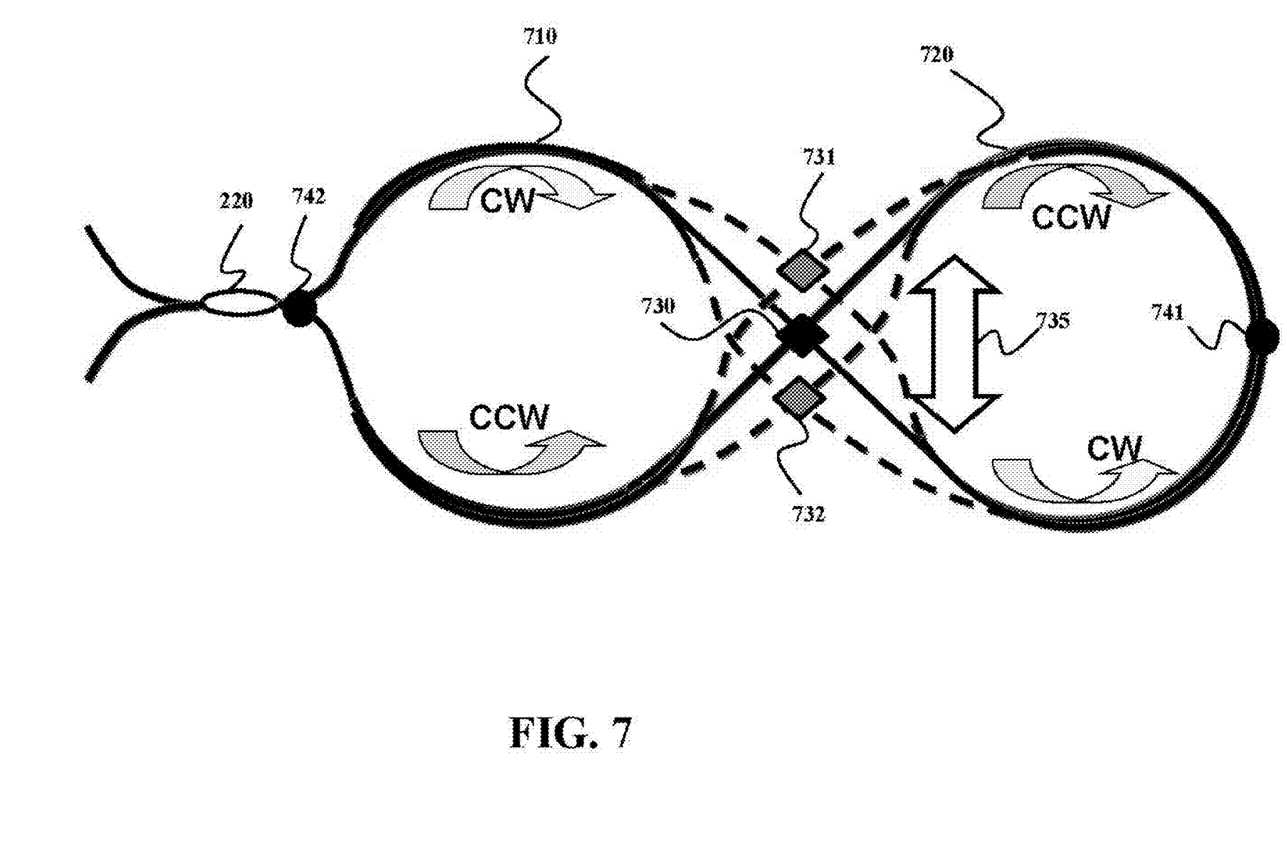
FIG. 7 depicts a schematic of an optical sensor according to another embodiment of the invention, suitable for measuring linear motion.

FIG. 7 shows a schematic of such a ring cavity that is arranged in a shape of figure eight forming two lobes 710 and 720 connected at a first point in order to form an accelerometer. In some embodiments, the lobes move with respect to each other, such that they experience effective rotations which combine to provide a total effective rotation of the ring cavity. Such "figure eight" arrangement can be mechanically mounted, e.g., at a second point 741 and/or 742 and designed to have acceleration sensitivity without rotation sensitivity. Such arrangement allows for the first point 730 to move 735 linearly, e.g., to the positions 731 and/or 732, with respect to a second point of the ring cavity.

Thus, if the original (gyro) fiber loop is reconfigured to resemble "FIG. 8", the same device can be used to measure linear motion: As the first point 730 moves with respect to the fiber loops (i.e.—up and down in the attached figure), the clockwise (CW) and counter-clockwise (CCW) propagating modes see different fiber lengths (similar to the gyro). For example, when the center moves up, photons following the CCW path need to traverse the greater length of the optical fiber as compared to those that follow the CW path. By measuring this path difference one can therefore detect the linear (in this case—vertical) motion of the "FIG. 8" parts. This path difference can be determined by measuring a frequency of the beat note 155.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

We claim:

1. A method for enhancing a sensitivity of an optical sensor having an optical cavity, the method comprising:
   counter-propagating beams of pump light within the optical cavity to produce scattered light based on Stimulated Brillouin Scattering (SBS), wherein properties of the pump light are selected to generate fast-light conditions for the scattered light, such that the scattered light includes counter-propagating beams of fast light;
   preventing the pump light from resonating within the optical cavity, while allowing the scattered light to resonate within the optical cavity; and
   interfering at least portions of the scattered light outside of the optical cavity to produce a beat note for a measurement of the optical sensor.

2. The method of claim 1, wherein the preventing is performed using an in-coupling interferometer integrated with the optical cavity, wherein lengths of a short path and a long path of the in-coupling interferometer selected such that beams of the pump light and the scattered light entered into an input of the in-coupling interferometer emerge from different outputs of the in-coupling interferometer, the method further comprising:
   selecting the length of the short path and the length of the long path of the in-coupling interferometer based on a difference between a frequency of the pump light and a frequency of the scattered light.

3. The method of claim 1, wherein the optical cavity includes a ring cavity, the method further comprising:
   measuring a frequency of the beat note to determine a rotation of the ring cavity.

4. The method of claim 1, wherein the properties of the pump light include an optical spectrum of the pump light and a power of the pump light.

5. The method of claim 1, further comprising:
   generating the pump light with an optical spectrum including at least two components at different frequencies;
   splitting the pump light to produce the beams of pump light including a first beam of pump light and a second beam of pump light; and
   coupling the beams of pump light into the optical cavity such that the first beam of pump light propagates along a first direction within the optical cavity and the second beam of pump light propagates along a second direction within the optical cavity, and wherein the first direction of propagation is opposite to the second direction of propagation.

6. The method of claim 5, wherein a difference between components of the optical spectrum is approximately 10-100 MHz.

7. The method of claim 6, wherein a frequency of one component of pump light is lower than a frequency of the scattered light by approximately 10 GHz, and wherein a frequency of another component of pump light is greater than a frequency of the scattered light by approximately 10 GHz.

8. The method of claim 1, wherein the step of interfering comprises:
   directing the portions of the scattered light outside of the optical cavity using an out-coupling interferometer integrated with the optical cavity, wherein lengths of a short path and a long path of the interferometer selected such that beams of the pump light and the scattered light entered into an input of the out-coupling interferometer emerge from different outputs of the out-coupling interferometer; and
   combining the portions of the scattered light outside of the optical cavity.

9. The method of claim 1, further comprising causing a finite offset of the two sets of beams of pumping light for facilitating independent control of the clockwise and counterclockwise pump spectra.

10. An optical sensor, comprising:
a ring cavity;
an in-coupling interferometer integrated with the ring cavity, wherein lengths of a short and a long path of the in-coupling interferometer are selected such that the pump light emerges from a first output of the in-coupling interferometer and the scattered light emerges from a second output of the in-coupling interferometer, wherein the first output is directed away from the ring cavity to prevent the pump light from completing multiple passes through the ring cavity and the second output directs the scattered light to stay within the ring cavity; and
an output coupler for directing at least portions of the scattered light outside of the ring cavity, while retaining the pump light within the ring cavity, and for interfering the portions of the scattered light outside of the ring cavity to produce a beat note for a measurement of the optical sensor.

11. The optical sensor of claim 10, further comprising:
a light source for generating the pump light; and
a detector comprising a photodiode for measuring a frequency of the beat note to determine a rotation of the ring cavity.

12. The optical sensor of claim 10, wherein at least one of the input coupler and the output coupler comprises:
an interferometer with lengths of a short path and a long path of the in-coupling interferometer selected based on a difference between a frequency of the pump light and a frequency of the scattered light such that the pump light and the scattered light entered into an input of the interferometer emerge from different outputs of the in-coupling interferometer.

13. The optical sensor of claim 10, wherein the output coupler comprises:
an out-coupling interferometer integrated with the ring cavity, wherein lengths of a short and a long paths of the out-coupling interferometer are selected such that at least part of the scattered light propagated in each direction is directed outside of the ring cavity; and
an interference module for interfering the scattered light received from the out-coupling interferometer to produce the beat note.

14. The optical sensor of claim 10, further comprising:
a first laser source for generating a first pump light;
a second laser source for generating a second pump light;
an optical combiner for combining the first and the second beams of pump light to produce the beams of pump light and a beat note of the beams of pump light;
a detector for measuring a frequency of the beat note of the beams of pump light; and
a controller for controlling the first and the second light source to maintain a fixed value of the beat note.

15. The optical sensor of claim 10, further comprising:
a manipulator for applying a predetermined time-variable force to the ring cavity, wherein one or more measurements correlated to the predetermined force are analyzed and used to improve operational stability of the optical sensor.

16. An optical sensor, comprising:
an optical cavity;
an in-coupling interferometer for accepting counter-propagating beams of pump light into the optical cavity to produce scattered light based on Stimulated Brillouin Scattering (SBS), wherein lengths of a short and a long path of the in-coupling interferometer are selected such that the pump light having properties for generating fast-light conditions for the scattered light emerges from a first output of the in-coupling interferometer directing the pump light away from the optical cavity to prevent the pump light from completing multiple passes through the optical cavity, and the scattered light emerges from a second output of the in-coupling interferometer that directs the scattered light to resonate within the optical cavity;
an out-coupling interferometer integrated with the optical cavity, wherein lengths of a short and a long paths of the out-coupling interferometer are selected such that at least part of the scattered light propagated in each direction is directed by the out-coupling interferometer outside of the optical cavity and the pump light propagated in each direction is directed by the out-coupling interferometer to stay within the optical cavity;
an interference module for interfering the scattered light received from the out-coupling interferometer to produce a beat note; and
a detector for measuring a frequency of the beat note to determine a measurement of the optical sensor.

17. The optical sensor of claim 16, wherein the optical cavity includes a ring cavity formed by an optical fiber, and wherein at least one of the in-coupling interferometer, the out-coupling interferometer, the interference module, and the detector are fabricated on a photonic integrated circuit (PIC).

18. The optical sensor of claim 17, further comprising:
a light source for generating the beams of pump light; and
fiber couplers for accepting the beams of pump light into the PIC.

* * * * *